United States Patent
Wang et al.

(10) Patent No.: US 9,355,265 B2
(45) Date of Patent: May 31, 2016

(54) COMPUTER DATA PROTECTION LOCK

(75) Inventors: Ning Yu Wang, Shanghai (CN); Chau Iou Jeng, Shanghai (CN); Shi Zhe Han, Shanghai (CN); Wei Ming Chu, Shanghai (CN); Yong Hiang Ng, Shanghai (CN); Yong Hong Duan, Shanghai (CN)

(73) Assignee: DELL PRODUCTS, LP, Round Rock, TX (US)

( * ) Notice: Subject to any disclaimer, the term of this patent is extended or adjusted under 35 U.S.C. 154(b) by 1095 days.

(21) Appl. No.: 12/731,882

(22) Filed: Mar. 25, 2010

(65) Prior Publication Data

US 2011/0239049 A1 Sep. 29, 2011

(51) Int. Cl.
G06F 21/34 (2013.01)
G06F 21/60 (2013.01)
H04L 29/12 (2006.01)
G06F 21/85 (2013.01)

(52) U.S. Cl.
CPC .............. *G06F 21/606* (2013.01); *G06F 21/34* (2013.01); *G06F 21/604* (2013.01); *G06F 21/85* (2013.01); *H04L 61/10* (2013.01); *G06F 2221/2147* (2013.01)

(58) Field of Classification Search
CPC ................. H04L 63/10–63/108; G06F 21/31; G06F 21/34–21/35; G06F 21/44–21/45; G06F 21/60; G06F 21/604; G06F 21/62–21/629; E05B 73/0082–73/0088; G11B 20/00159
USPC .......... 340/5.1–5.2, 5.3–5.31; 710/1, 36, 100, 710/107; 726/2, 34–35, 4–6, 9, 17–21, 726/27–30
See application file for complete search history.

(56) References Cited

U.S. PATENT DOCUMENTS

| | | | |
|---|---|---|---|
| 5,264,742 A | 11/1993 | Sourgen | |
| 5,333,306 A | 7/1994 | Abe | |
| 5,339,397 A | 8/1994 | Eikill et al. | |
| 5,552,777 A | 9/1996 | Gokcebay et al. | |
| 5,794,466 A * | 8/1998 | Hungerford et al. | 70/63 |
| 5,917,908 A | 6/1999 | Takenaka et al. | |
| 5,991,197 A | 11/1999 | Ogura et al. | |
| 6,031,757 B1 | 2/2000 | Chuang et al. | |
| 6,223,571 B1 * | 5/2001 | Rector | 70/276 |
| 7,140,889 B1 * | 11/2006 | Shah et al. | 439/133 |
| 2005/0097279 A1 * | 5/2005 | Nakanishi | 711/147 |
| 2006/0054729 A1 * | 3/2006 | Salentine et al. | 242/379 |
| 2006/0145847 A1 * | 7/2006 | Simpson et al. | 340/568.1 |
| 2007/0260655 A1 | 11/2007 | Adams et al. | |
| 2008/0178281 A1 * | 7/2008 | Narayanaswami et al. | 726/17 |

OTHER PUBLICATIONS

Palsetia, Diana. "Digital Logic and Boolean Algebra". Slides for 2007-Spring CIT 595. <http://www.cis.upenn.edu/~palsetia/cit595s07/digitalboolean.pdf>.*

* cited by examiner

*Primary Examiner* — Linglan Edwards
*Assistant Examiner* — Kevin Bechtel
(74) *Attorney, Agent, or Firm* — Larson Newman, LLP

(57) ABSTRACT

An information handling system includes a lock, a switch, and a south bridge. The lock is configured to receive a key and to alternate between a locked position and an unlocked position. The switch is in communication with the lock. The switch is configured to receive a signal from the lock, to close if the lock is in the locked position, and to open if the lock is in the unlocked position. The south bridge is in communication with the switch. The south bridge is configured to disable a plurality of communication ports of the information handling system when the switch is closed, and configured to enable the communication ports when the switch is opened.

8 Claims, 5 Drawing Sheets

COMPUTER DATA PROTECTION LOCK

FIELD OF THE DISCLOSURE

This disclosure relates generally to information handling systems, and more particularly relates to a computer data protection lock.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A computer can have different basic input/output system (BIOS) settings to control how the computer operates. For example, one BIOS setting can enable or disable the communication ports of the computer. The communication ports can include a serial advance technology attachment (SATA) communication port, a universal serial bus (USB) communication port, a Bluetooth communication port, an RJ11 communication port, or the like. If the user wants to ensure that the communication ports are enabled or disabled, the user may set a password to protect the ability to change the setting.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
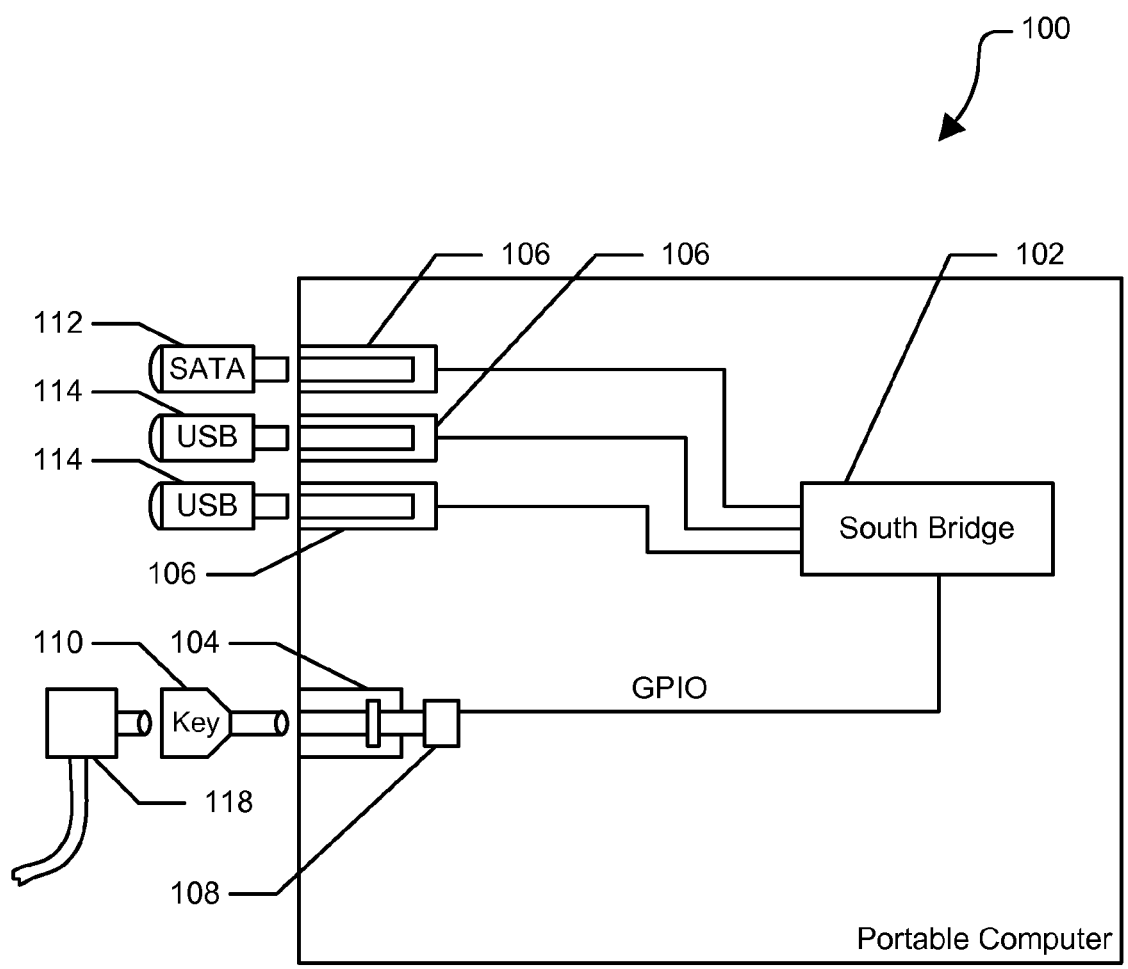
FIG. 1 is block diagram of an information handling system including a mechanical lock.

FIG. 1 shows an information handling system such as a portable computer 100. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The computer 100 includes a south bridge 102, a locking mechanism 104, and communication ports 106. The locking mechanism 104 includes a mechanical lock 108. The mechanical lock 108 of locking mechanism 104 is in communication with the south bridge 102 via a control line, labeled general purpose input/output (GPIO). The south bridge 102 is also in communication with each of the communication ports 106. The mechanical lock 108 can be placed in physical communication with a key 110 that can be inserted into the locking mechanism 104.

The communication ports 106 can be serial advanced technology attachment (SATA) communication ports, universal serial bus (USB) communication ports, Bluetooth communication ports, Infrared (IR) communication ports, RJ11 communication ports, RJ45 communication ports, or any combination thereof. Thus, the communication ports 106 can provide the south bridge 102 with communication to other devices, such as a SATA device 112, USB devices 114, other computers, or the like. The south bridge 102 can communicate with the SATA device 112 and with the USB devices 114 when the SATA device and the USB devices are inserted into the communication ports 106. The key 110 can also connect to a Kensington key 118 that can be used to secure the computer 100 in a specific location as discussed below.

A user can utilize the key 110 to disable or enable the communication ports 106 of the computer 100. The user can insert the key 110 into the locking mechanism 104, and can lock the key into place. When the key 110 is locked into place, the user can rotate the key to move the mechanical lock 108 between a locked position 202 and an unlocked position 302 as shown in FIGS. 2 and 3.

Figure 2:
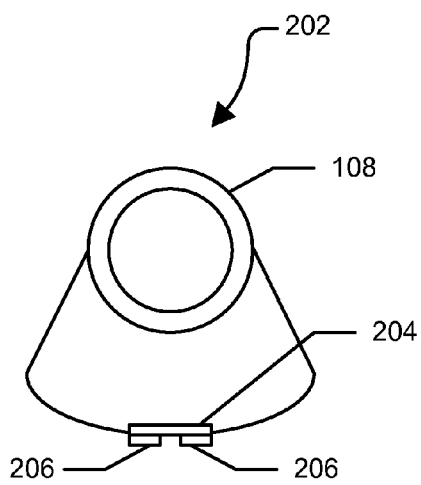
FIGS. 2 and 3 are schematic diagrams of the mechanical lock.
Figure 3:
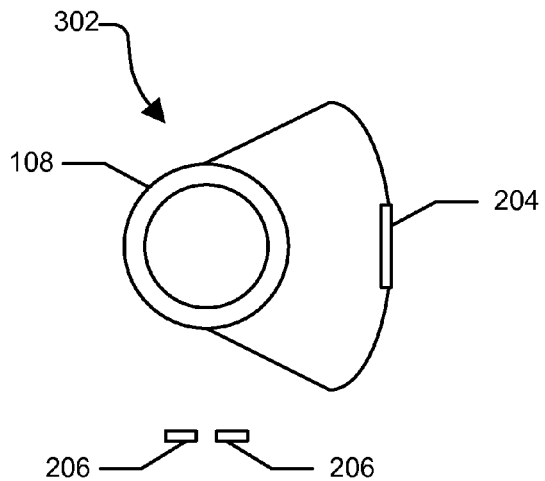

FIGS. 2 and 3 show schematic diagrams of the mechanical lock 108 respectively in the locked position 202 and the unlocked position 302. The mechanical lock 108 includes a contact 204 and contact pads 206. As stated above, the key 110 can be utilized to rotate the mechanical lock 108 between the locked position 202 and the unlocked position 302. When the mechanical lock 108 is in the locked position 202, the contact 204 is preferably in physical communication with the contact pads 206. Alternatively, when the mechanical lock 108 is in the unlocked position 302, the contact 204 is preferably not in physical communication with the contact pads 206. The locked position 202 preferably causes the south bridge 102 to disable some or all of the communication ports 106 as discussed below. The physical communication between the contact 204 and the contact pads preferably transmits a signal to an electrical switch 402 as shown in FIG. 4.

Figure 4:
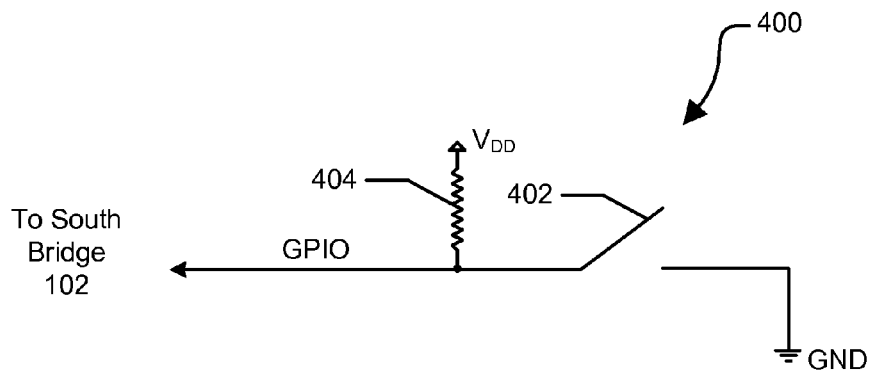
FIG. 4 is a schematic diagram of a control line circuit within the information handling system.

FIG. 4 shows a schematic diagram of a control line circuit 400 including the electrical switch 402 and a resistor 404. The electrical switch 402 has a first terminal connected to a first voltage reference, labeled GND, and a second terminal connected to the control line GPIO of the south bridge 102. The resistor 404 has a first terminal connected to the control line GPIO of the south bridge 102, and a second terminal connected to a second voltage reference, labeled $V_{DD}$. When the mechanical lock 108 is in the unlocked position 302, the electrical switch 402 is open and the control line GPIO is pulled high to the second voltage reference $V_{DD}$ via the resistor 404. Thus, the control line GPIO and the resistor 404 are preferably not connected to the first voltage reference GND such that there is not a voltage drop across the resistor to cause the control line GPIO to have a voltage level below the second voltage reference $V_{DD}$.

However, when the mechanical lock 108 is in the locked position 302, the physical communication between the contact 204 and the contact pads 206 transmits a signal to the electrical switch 402. When the electrical switch 402 receives the signal, the electrical switch preferably closes and the control line GPIO is pulled low to the first voltage reference GND. When the resistor 404 is connected to the first voltage reference, the resistor has a voltage drop across it that is substantially equal to the second voltage reference $V_{DD}$. Thus, the voltage level of the control line GPIO is preferably low and substantially equal to the first voltage reference GND.

Referring again to FIG. 1, when the computer 100 is rebooted, turned on, or the like, the voltage level and/or state of the control line continues to be set high or low depending on the position of the mechanical lock 104. During the start-up of the computer 100, the south bridge 102 executes a basic input/output system (BIOS) power-on self-test (POST). During the BIOS POST, the south bridge 102 preferably detects the voltage level of the control line GPIO. The user can preset the BIOS within the south bridge 102 to disable individual ones or all of the communications ports 106 in response to voltage level of the control line GPIO.

For example, the user can set that the south bridge 102 disables the communication ports 106 associated with the SATA device 112 and the USB device 114 when the voltage level of the control line GPIO is low. The user can also set that the other communication ports 106, such as the Bluetooth, IR, RJ45, and RJ11 communication ports, can always be enabled by the south bridge 102. Thus, the user can prevent the computer 100 from communicating with the SATA device 112 and/or the USB device 114. However, the user setting can still allow someone to communicate with another device via the Bluetooth communication port, the IR communication port, the RJ45 communication port, and/or RJ11 communication port. Thus, the user can determine what type of communication, if any, the computer 100 can utilize based on the settings in the BIOS and the position of the mechanical lock 108.

When the BIOS POST executes, the control line voltage level is detected and a flag can be set in the BIOS if the voltage level is high. The BIOS POST can then continue to execute and determine whether to initiate each of the communication ports 106. During the BIOS POST, a determination can made individually for each communication port 106 whether to initiate that communication port. For example, during a determination of whether to initiate the SATA communication port 106, the execution of the BIOS POST can detect whether the user has set that the SATA communication port is to be disabled if the control line GPIO is low. If the user has set that the SATA communication port 106 is to be disabled based on the voltage state of the control line, during the BIOS POST execution the communication port is preferably not initiated when a determination is made that the control line is at the low voltage state. The same process is preferably followed for each of the communication ports 106 during the BIOS POST. Disabling the communication ports 106 can protect the data on the computer 100 from being copied and/or transferred to another device.

The Kensington key 118 can be any device that can be used to secure the computer 100 to a table, wall, floor, or the like. For example, the Kensington key 118 can include a cable that is connected to a table so that the computer 100 cannot be removed from the table. The key 110 connected to the locking mechanism 104 can include an opening opposite the computer 100, such that the Kensington key 118 can be inserted into the key. When the Kensington key 118 is inserted within the key 110, the Kensington key can be securely connected to the key.

Figure 5:
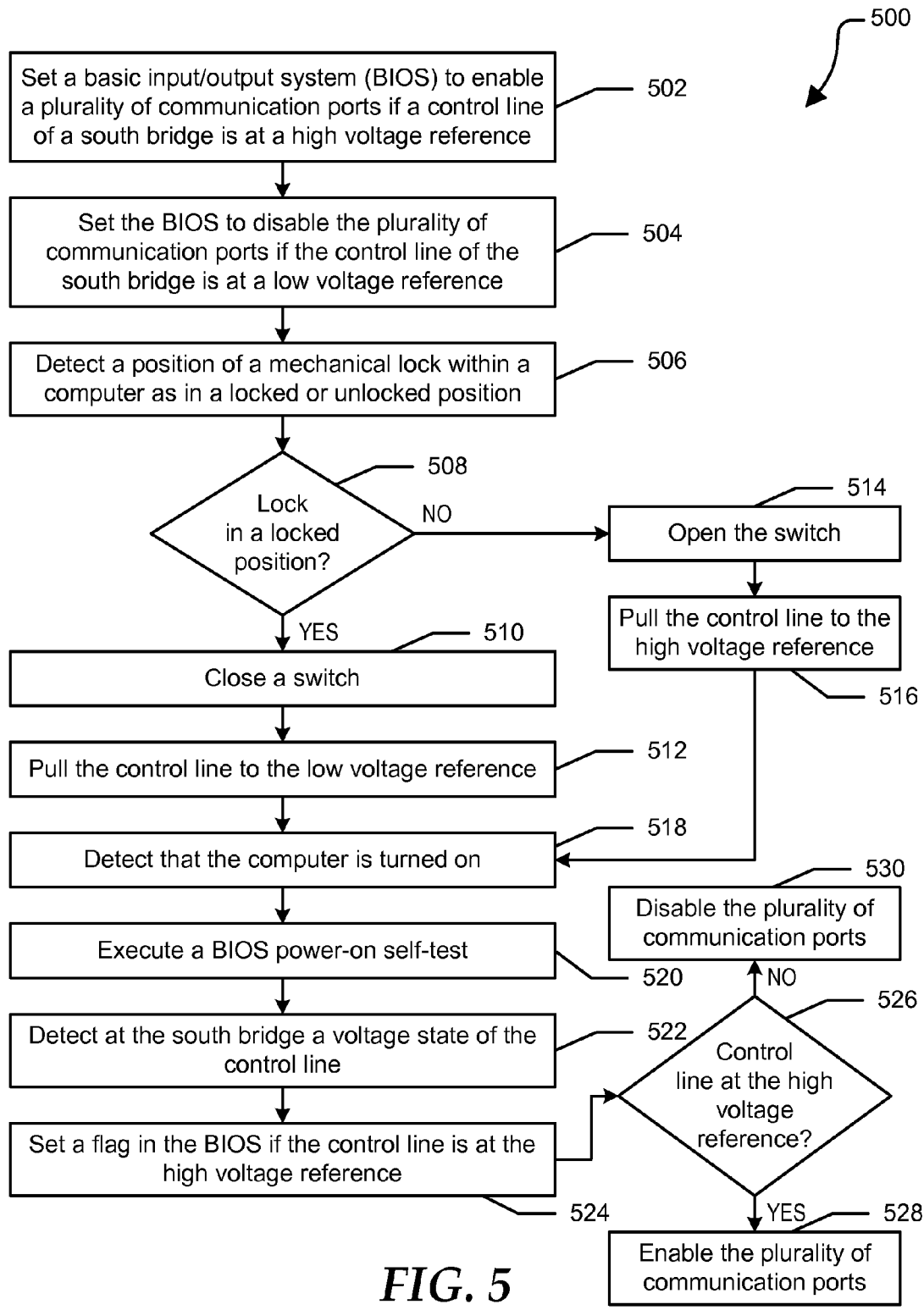
FIG. 5 is a flow diagram of a method for enabling or disabling the communication ports of the information handling system.

FIG. 5 shows a flow diagram of a method 500 for enabling or disabling the communication ports of the computer. At block 502, a BIOS within a south bridge is set to enable a plurality of communication ports in the computer if a control line of the south bridge is at a high voltage reference. The plurality of communication ports can be all of the communication ports in the computer, a portion of the communication ports, or the like. The BIOS is set to disable the plurality of communication ports if the control line of the south bridge is at a low voltage reference at block 504. The determination of the voltage reference of the control line is preferably determined during a BIOS POST. At block 506, a position of a mechanical lock within the computer is detected as being either in a locked position or an unlocked position.

A determination is made whether the lock is the locked position as block 508. If the lock is in the locked position, a switch is closed at block 510 and the control line is pulled to the low voltage reference at block 512. If the lock is in the unlocked position, the switch is opened at block 514 and the control line is pulled to the high voltage reference at block 516. The switch can be an electrical switch that can receive a signal from the lock based on the position of the lock.

At block 518, the computer is detected as being turned on. A BIOS POST is executed at block 520. At block 522, a voltage state of the control line at the south bridge is detected. A flag is set in the BIOS if the control line is at the high voltage reference at block 524. At block 526, a determination is made whether the control line is at the high voltage reference. If the control line is at the high voltage reference, the plurality of communication ports are enabled at block 528. If the control line is not at the high voltage reference, the plurality of communication ports are disabled at block 530.

Figure 6:
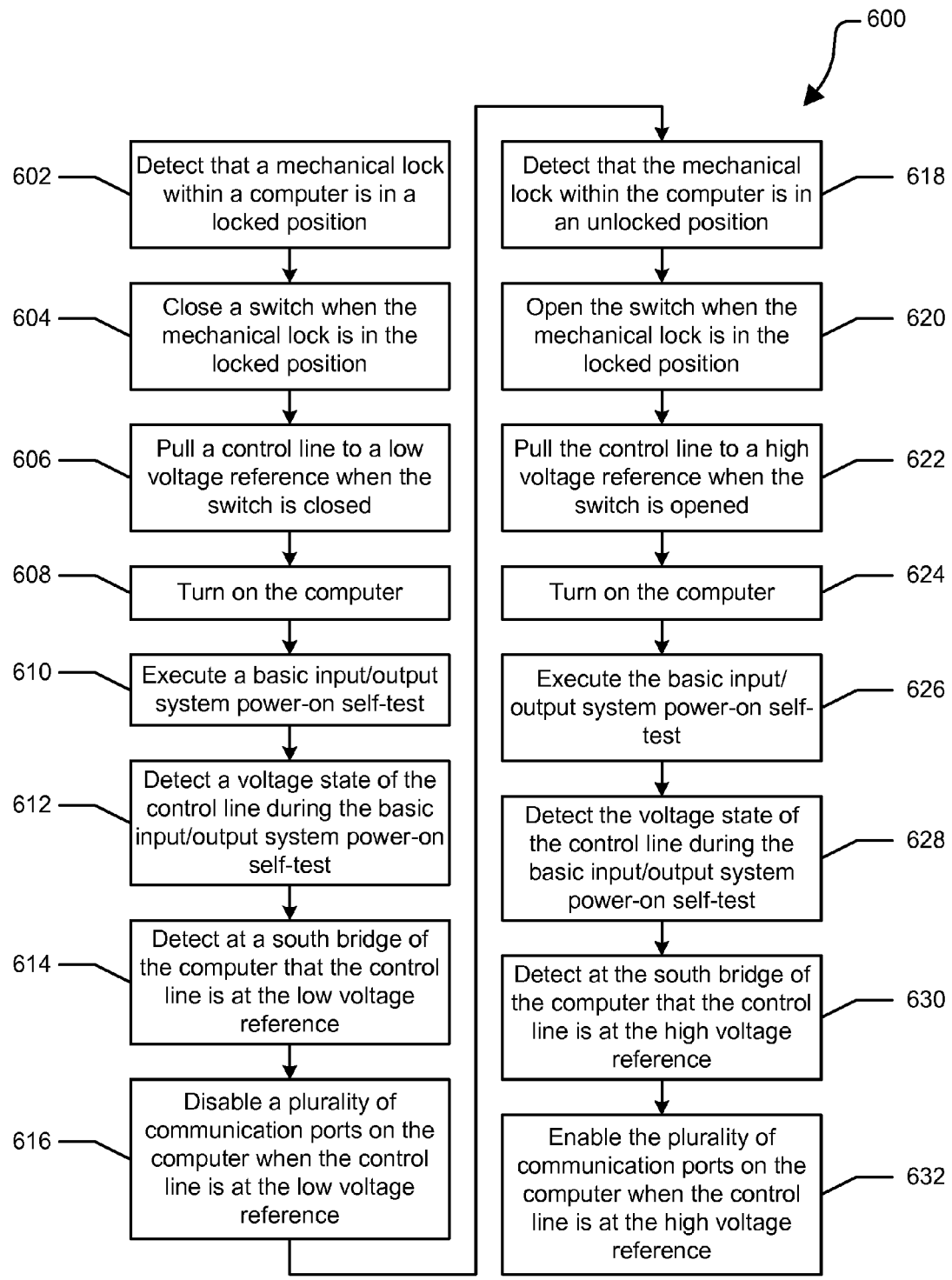
FIG. 6 is a flow diagram of an alternative method for enabling or disabling the communication ports.

FIG. 6 shows a flow diagram of an alternative method for enabling or disabling the communication ports of the computer. At block 602, a mechanical lock within a computer is detected as being in a locked position. A switch is closed when the mechanical lock is in the locked position at block 604. The switch can be an electrical switch configured to open or close based on a signal received from the mechanical lock.

At block 606, a control line is pulled to a low voltage reference when the switch is closed. The computer is turned on at block 608.

At block 610, a BIOS POST is executed in response to the computer being turned on. A voltage state of the control line is detected during the BIOS POST at block 612. At block 614, the south bridge of the computer detects that the control line is at the low voltage reference. A plurality of communication ports are disabled when the control line is at the low voltage reference at block 616.

At block 618, the mechanical lock within the computer is detected as being in an unlocked position. The switch is closed when the mechanical lock is in the unlocked position at block 620. At block 622, the control line is pulled to a high voltage reference when the switch is opened. The computer is turned on at block 624.

At block 626, the BIOS POST is executed in response to the computer being turned on. The voltage state of the control line is detected during the BIOS POST at block 628. At block 630, the south bridge of the computer detects that the control line is at the high voltage reference. The plurality of communication ports are enabled when the control line is at the high voltage reference at block 632.

Figure 7:
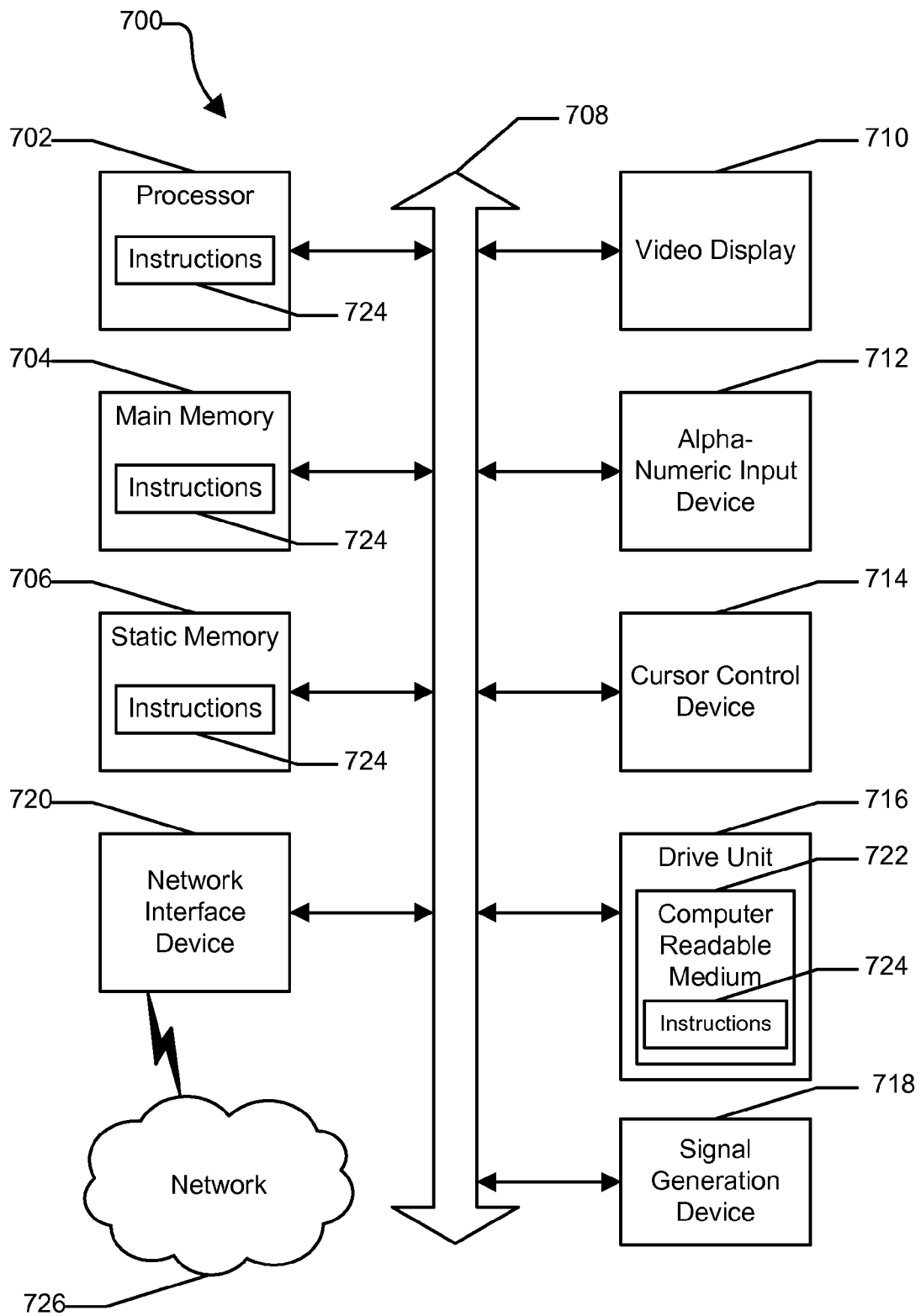
FIG. 7 is a block diagram of a general computer system.

FIG. 7 shows an illustrative embodiment of a general computer system 700 in accordance with at least one embodiment of the present disclosure. The computer system 700 can include a set of instructions that can be executed to cause the computer system to perform any one or more of the methods or computer based functions disclosed herein. The computer system 700 may operate as a standalone device or may be connected such as using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

The computer system 700 may include a processor 702 such as a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724 such as software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media. The network interface device 720 can provide connectivity to a network 726, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
  a mechanical lock configured to receive a first key and configured to rotate between a locked position and an unlocked position, wherein the lock comprises a contact and contact pads, wherein when the mechanical lock is in the locked position, the contract is in physical communication with the contact pads, and wherein when the mechanical lock is in the unlocked position, the contact is not in physical communication with the contact pads, and wherein a second key attached to a particular location by cable is securely connected to the first key, thereby securing the information handling system in the particular location;
  a control line circuit comprising a resistor and a switch, wherein the switch is configured to receive a signal from the contact and contact pads of the mechanical lock, wherein the resistor has a first terminal connected to a control line and a second terminal connected to a high voltage reference, wherein the switch has a first terminal connected to the control line and a second terminal connected to a low voltage reference, and wherein:
    if the position of the mechanical lock is the locked position:
      the switch receives a signal from the physical communication between the contact and the contact pads in response to the physical communication between the contact and the contact pads;
      the switch closes in response to receiving the signal, wherein closing the switch pulls the control line to the low voltage reference; and
    if the position of the mechanical lock is the unlocked position;
      the switch opens, wherein opening the switch pulls the control line to the high voltage reference; and
  a south bridge, wherein the control line is connected to a GPIO of the south bridge, and wherein during a start-up of the information handling system, the south bridge executes a basic input/output system (BIOS) power-on self-test (POST), and wherein during the BISO POST, the south bridge disables individual ones of or all of a plurality of communication ports of the information handling system in response to the voltage level of the control line being connected to the GPIO and based upon user presets in the BIOS.

2. The information handling system of claim 1 wherein the basic input/output system is configured to set a flag when the switch is closed.

3. The information handling system of claim 1 wherein the communication ports include universal serial bus communication ports, serial advanced technology attachment communication ports, Bluetooth communication ports, RJ45 communication ports, RJ11 communication ports, or any combination thereof.

4. A method comprising:
  detecting a position of a mechanical lock within an information handling system via a control line circuit comprising a resistor and a switch, wherein the resistor has a first terminal connected to a control line and a second terminal connected to a high voltage reference, wherein the switch has a first terminal connected to the control line and a second terminal connected to a low voltage reference, wherein a first key is used to rotate the lock between a locked position and an unlocked position, wherein the mechanical lock is in the locked position when a contact of the mechanical lock is in physical communication with contact pads in the information handling system, and wherein the mechanical lock is in the unlocked position when a contact of the mechanical lock is not in physical communication with contact pads in the information handling system, and wherein a second key attached to a particular location by cable is secure connected to the first key;
  if the position of the mechanical lock is the locked position:
    sending a signal from the physical communication between the contact and the contact pads to the switch in the information handling system in response to the physical communication between the contact and the contact pads; and
    closing the switch in response to the signal, wherein closing the switch pulls the control line to the low voltage reference;
  if the position of the mechanical lock is the unlocked position:
    opening the switch, wherein opening the switch pulls the control line to the high voltage reference
  detecting that the information handling system is turned on, wherein during a start-up of the information handling system, a south bridge of the information handling system executes a basic input/output system (BIOS) power-on self-test (POST);
  receiving a second key attached to a particular location by cable within an opening of the first key, thereby securing the information handling system in the particular location;
  detecting at a south bridge of the information handling system a voltage state of the control line connected to a GPIO of the south bridge during the BIOS POST, wherein:
    if the control line is at the low voltage reference, disabling a plurality of communication ports of the information handling system; and
    if the control line is at the high voltage reference, enabling the communication ports.

5. The method of claim 4 further comprising:
  setting a flag in the basic input/output system if the control line is at the high voltage.

6. The method of claim 4 wherein the communication ports include universal serial bus communication ports, serial advanced technology attachment communication ports, Bluetooth communication ports, RJ45 communication ports, RJ11 communication ports, or any combination thereof.

7. A method comprising:
  detecting a position of a mechanical lock within an information handling system via a control line circuit comprising a resistor and a switch, wherein the resistor has a first terminal connected to a control line and a second terminal connected to a high voltage reference, wherein the switch has a first terminal connected to the control line and a second terminal connected to a low voltage reference, wherein a first key is used to rotate the lock between a locked position and an unlocked position, wherein the mechanical lock is in the locked position when a contact of the mechanical lock is in physical communication with contact pads in the information handling system, and wherein the mechanical lock is in the unlocked position when a contact of the mechanical lock is not in physical communication with contact pads in the information handling system, and wherein a second key attached to a particular location by cable is securely connected to the first key;
  if the position of the mechanical lock is the locked position:
    sending a signal from the physical communication between the contact and the contact pads to the switch in the information handling system in response to the physical communication between the contact and the contact pads; and
    closing the switch in response to the signal, wherein closing the switch pulls the control line to the low voltage reference;
  if the position of the mechanical lock is the unlocked position:
    opening the switch, wherein opening the switch pulls the control ne to the high voltage reference
  detecting that the information handling system is turned on, wherein during a start-up of the information handling system, a south bridge of the information handling system executes a basic input/output system (BIOS) power-on self-test (POST);
  receiving a second key attached to a particular location by cable within an opening of the first key, thereby securing the information handling system in the particular location;
  detecting at a south bridge of the information handling system a voltage state of the control line connected to a GPIO of the south bridge during the BIOS POST, wherein the south bridge disable individual ones of or all of a plurality of communication ports of the information handling system in response to the voltage level of the control line connected to the GPIO and based upon presets in the BIOS.

8. The method of claim 7 wherein the communication ports include universal serial bus communication ports, serial advanced technology attachment communication ports, Bluetooth communication ports, RJ45 communication ports, RJ11 communication ports, or any combination thereof.

* * * * *